Dec. 26, 1950  A. A. DROS  2,535,488
DEVICE COMPRISING A GAS TURBINE
Filed Dec. 26, 1947
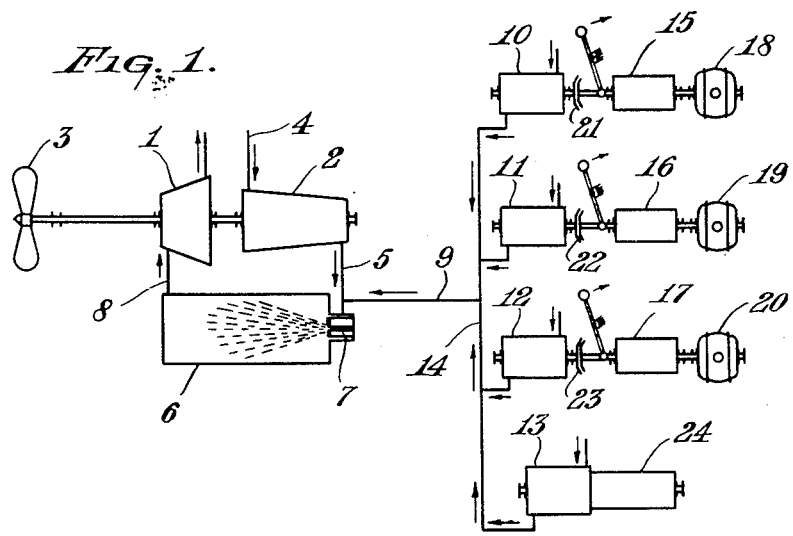
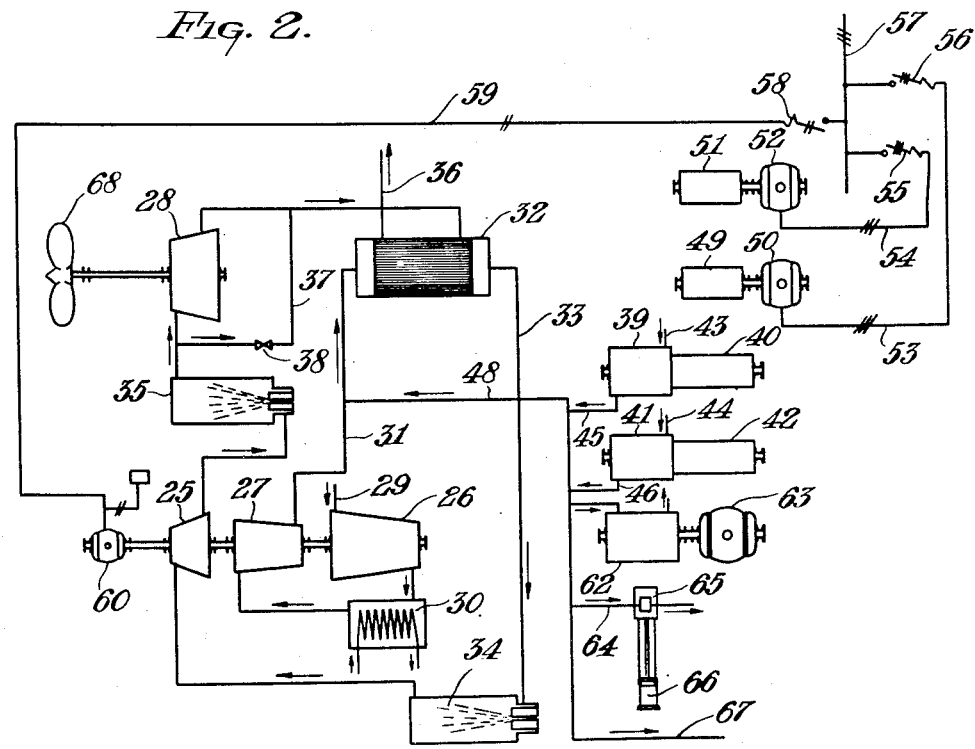
INVENTOR.
ALBERT A. DROS
BY Fred M. Vogel
AGENT

UNITED STATES PATENT OFFICE 2,535,488

DEVICE COMPRISING A GAS TURBINE

Albert A. Dros, Eindhoven, Netherlands, assignor to Hartford National Bank and Trust Company, Hartford, Conn., as trustee Application December 26, 1947, Serial No. 793,769
In the Netherlands April 25, 1946

Section 1, Public Law 690, August 8, 1946
Patent expires April 25, 1966

3 Claims. (Cl. 290—4)

This invention relates to an installation comprising a gas-turbine. One of the properties of a gas turbine is that the power and the efficiency greatly depend upon the operating conditions of the installation. Thus, for instance, even a small temperature increase of the air drawn in by the compressor(s) involves a comparatively large decrease of the useful power and the efficiency of the installation. Also, a slight decrease in efficiency of the compressor(s) and the turbine(s), for instance caused by wear and tear, has an appreciable detrimental effect.

This property may be explained by the fact that the useful power of a gas turbine constitutes the difference between the powers of the turbine(s) and the compressor(s), which power are multiples of the useful power.

To ensure that the gas turbine is able to develop its full power under all circumstances, one is consequently compelled to give the gas turbine a much larger size than is required under normal circumstances. Due to this, however, the engine operates with small partial load i. e. that the quantity of medium compressed in the compressor(s) is much larger than is necessary under these circumstances, which is detrimental to the efficiency. Under these conditions the fuel consumption is consequently much higher than if the engine were constructed to operate only under normal conditions.

In many cases the average load of a gas turbine will be much smaller than the maximum load. The efficiency of a gas turbine usually decreases materially upon a decrease in load, so that it would be of importance that size of the engine, more particularly the capacity of the compressor(s), is not larger than is necessary for the average load.

There is, however, another reason why a comparatively high capacity of the compressor(s) is unfavourable. In many gas turbines expansion of the medium occurs in two stages, first in the high-pressure turbine and after that in the low-pressure turbine. Usually one of the two turbines actuates the compressors, whereas the other supplies the useful power. Since the power required for driving the compressor(s) materially exceeds the useful power, the compressor turbine will have to work up a larger temperature drop than the turbine supplying the useful power. Consequently, the difference in temperature drop in the two turbines must be larger as the capacity of the compressors is higher. By thermodynamics it can easily be shown, however, that the optimum efficiency of a gas turbine with expansion in two stages is only ensured if the temperature drop in the two turbines is practically equal.

From this it follows that it would be important to be able to limit the capacity of the compressor(s) in such manner that the power of the turbine actuating this (these) compressor(s) does not exceed or only slightly exceeds the useful power.

The use of the invention permits the capacity of the compressor(s) driven by the gas turbine to be greatly reduced, whilst ensuring development of the full power under all circumstances.

The invention consists in that any deficit in capacity of gas turbine-driven compressor(s) can be supplemented by means of a source of energy which is independent of the gas turbine.

To this end the installation according to the invention exhibits the feature that it comprises one or more compressors driven by the gas turbine itself and in addition one or more compressors or and pressure gas producers, which are driven by separate piston engines and supply the required quantity of medium under pressure to the gas turbine.

By adding one or more pressure gas producers or separately driven compressors, in accordance with the aforesaid deficit the installation develops the full power under all conditions. In this manner it is ensured that the gas turbine always functions with optimum efficiency.

At first glance, this addition of separately driven compressors to the gas turbine appears to be undesirable, since the installation is no longer a unit.

However, we have found that in this way considerable advantages are obtained. Otherwise there are many power installations which do not constitute a unit.

For instance, in many marine installations one or more auxiliary power engines are arranged beside the main power engine.

These auxiliary power engines are usually coupled with dynamos. Such an aggregate is usually called an auxiliary dynamo. These auxiliary dynamos supply the required energy for driving deck engines and auxiliary engines, for elimination and so on. The driving power engines are usually Diesel engines or steam engines.

On most vessels the quantity of energy required at sea is smaller than in the harbour so that at sea at least one, but usually two auxiliary dynamos are out of service.

By making use, according to one embodiment of the invention, of that part of the power of the auxiliary dynamos which is not used at sea, the capacity of the gas turbine-driven compressors can be further raised by increasing the speed thereof by means of an electric motor. Consequently, this electric motor is fed from the auxiliary dynamos.

Since, the aforesaid suppletion or electrical energy to the gas turbine involves a loss of approximately 20% in all in the dynamo and electric motor, which loss does not occur in the aforesaid method the efforts are generally directed to compensate the capacity deficit of gas turbine-driven compressor(s) first of all by means of pressure gas producers or separately driven compressors, the excess electrical power of the auxiliary dynamos being only considered as additional compensation which may be used under very unfavourable conditions.

In order to utilise the power of the auxiliary engines to the best advantage, but to avoid the aforesaid electric losses, the engines for the auxiliary dynamos may also directly drive a compressor. Since this compressor need not always operate when the auxiliary dynamo in question is required to supply current, a disengageable clutch must be provided between engine and compressor.

As an alternative, however, the number of auxiliary dynamos operated by Diesel engines can be reduced by using the medium which has been compressed in the pressure gas producers or separately driven compressors for driving expansion power engines (for instance compressed air engines) with which dynamos are coupled.

Furthermore different pumps, deck and other auxiliary equipment can be driven by means of pressure gas or compressed air, which equipment will often be cheaper than if it is driven electrically and, moreover, will excel in adjustability. Also for starting up the gas turbine use may be made of pressure gas or compressed air, for instance by supplying pressure gas or compressed air through the same pipe through which the capacity deficit of gas turbine-driven compressors is compensated during operation.

In a further suitable embodiment of the invention the maximum energy given off by the gas turbine to the compressor(s) driven by it amounts to such a value that this (these) compressors(s) are able to supply to the gas turbine a quantity of medium approximately corresponding to what is required by the gas turbine with a load lower than the maximum load thereof. In this event, however, the capacity deficit with higher loads is compensated in the manner referred to.

In order that the invention may be more clearly understood and readily carried into effect, it will now be described more fully with reference to the accompanying drawing, in which examples of installations comprising a gas turbine and constructed according to the invention, are represented diagrammatically in Figures 1 and 2.

In Fig. 1 the reference number 1 denotes the turbine proper which both drives the compressor 2 and supplies the useful power, for instance to the screw 3 of a vessel. The compressor 1 draws in the medium at 4. In an open cycle gas turbine as represented this medium consists of air of atmospheric pressure and temperature.

In a closed cycle gas turbine, to which the invention likewise applies, the pressure may have any desired value, but the temperature will be kept as low as possible.

The medium is compressed by the compressor 2 and forced to the combustion chamber 6 through the pipe 5. In this combustion chamber 6 the medium is heated by means of fuel which is supplied at 7 and is burnt in this chamber.

Through the pipe 8 the medium flows to the turbine 1 in which it expands, and finally it is either carried off to the funnel (open cycle gas turbine) or first cooled and subsequently drawn in again by the compressor at 4 (closed cycle gas turbine).

The temperature of the medium for the turbine 1 will be raised to such a point as the material of the blades of the turbine is able to withstand, since the efficiency of the gas turbine is better as this temperature is higher.

If the temperature of the medium drawn in at 4 increases, due to atmospheric influences, the compressor 2 will draw in a smaller quantity by weight per unit time, so that a smaller quantity by weight will expand in the turbine.

Since the temperature of the turbine cannot be raised further, the pressure of the turbine will decrease and consequently the expansion ratio and the temperature drop in the turbine will decrease, hence the power of the turbine will greatly decrease.

True, the power taken up by the compressor will also slightly decrease owing to the smaller compression ratio, but since the volume drawn in remains unchanged, the said power will much less decrease than the power of the turbine. Due to this the useful power supplied to the screw 3 which, in effect, constitutes the difference between the much higher powers of turbine and compressor decreases very considerably.

A corresponding effect is brought about by a decrease in efficiency of the compressor or turbine, which decrease may, for instance, be caused by wear and tear or fouling.

Consequently, a gas turbine is very sensitive to the circumstances under which it operates and for this reason it has hitherto been customary in gas turbines to choose the capacity of the compressor much higher than is necessary if the system were required to supply the full power always under the same circumstances. Of course, all this affects the fuel consumption very adversely.

In the installation referred to, however, the capacity of the compressor 2 is not higher than is necessary for supplying the required quantity of medium to the turbine under definite predetermined conditions. The usual (average) load of the turbine may then be used as a measure. The capacity of the compressor may even be made smaller if, in practice, the turbine is frequently loaded to a degree lower than the average load.

If, however, under unfavourable circumstances the full power is required to be produced by the turbine and the capacity of the compressor is consequently not sufficient, an additional quantity of medium is supplied, through the pipe 9, to the system at a point located between the compressor 2 and the combustion chamber 6.

This additional quantity is compressed in one or more of the compressors 10, 11, 12 and 13 and flows through the pipe 14 to the pipe 9.

The compressors 10, 11 and 12 are driven by the auxiliary motors 15, 16 and 17 respectively if the couplings 21, 22 and 23 respectively are engaged.

This arrangement may, for instance, occur in marine installations. In this case the auxiliary motors 15, 16 and 17 are coupled to dynamos 18, 19 and 20 respectively which need supply only little current at sea, since the winches are then out of service. The excess power of the auxiliary motors 15, 16 and 17 may consequently be used for driving the compressors 10, 11 and 12. The dynamos 18, 19 and 20 are driven by associated piston engines e. g. petrol or Diesel engines (not represented).

As a rule, however, this excess will not be sufficient for compensating the capacity deficit of the compressor 2 under unfavourable circumstances, so that a fourth compressor 13 is installed which is driven by the piston engine 24.

If the gas turbine has a closed cycle the suction pipes of the compressors 10, 11, 12 and 13 are connected to the suction pipe 4 of the compressor 2.

In Figure 1, the compressors 10, 11, 12 and 13 are connected parallel with the compressor 2.

Sometimes it may be advantageous to connect the compressors 10, 11, 12 and 13 in series with the compressor 2.

In these cases the medium may either first be drawn in by the compressor 2, compressed to an intermediate pressure, and subsequently be compressed to a higher pressure by the compressors 10, 11, 12 and 13, or first be drawn in by the compressors 10, 11, 12 and 13, compressed to an intermediate pressure and subsequently be compressed to a higher pressure by the compressor 2.

In Figure 2 a gas turbine installation is represented diagrammatically, in which compression and expansion occurs in two stages. In this construction use is made of a heat exchanger.

In this event the high pressure turbine 25 drives the low pressure compressor 26 and the high pressure compressor 27. The low pressure turbine does not drive a compressor but solely supplies the useful power, for instance to a ship's screw 68.

In this installation the turbine 25 is required to be able to drive the compressors 26 and 27 under all circumstances. For thermal dynamical reasons the efficiency of the system exhibits the highest value if the power of the high pressure turbine 25 is of the same order of magnitude as that of the low pressure turbine 28. This can only be ensured by reducing the capacity of the compressors 26 and 27. In this case, consequently, the use of the invention is of much importance.

The installation operates as follows:

The medium is drawn in at 29 by the low pressure compressor 26, wherein it is compressed, whereupon it flows through the intermediate cooler 30 to the high-pressure compressor 27 in which it is further compressed. Through the pipe 31 it flows to the heat exchanger 32 wherein it takes up part of the heat of the medium subsequently expanded in the turbines, whence it flows through the pipe 33 to the high-pressure combustion chamber 34 where it is further heated, and subsequently it is partly expanded in the turbine 25. After that it is reheated in the low-pressure combustion chamber 35 and finally expands completely in the turbine 28. Through the regenerator 32 the gas escapes through the pipe 36 to the funnel in the case of a gas turbine with an open cycle system. In the case of a gas turbine with a closed cycle system the medium is drawn in again by the compressor 26.

The capacity of the compressors 26 and 27 is not sufficient for operation of the turbine under all circumstances. In conjunction herewith any capacity deficit of these compressors 26 and 27 may be supplemented through the pipe 48.

The compressors 39 and 41 drawn in medium (atmospheric air) through 43 and 44 respectively (if the gas turbine is of the closed cycle type the suction pipes 43 and 44 are connected to the suction pipe 29 of the low pressure compressor 26) and force it in the compressed state through the pipes 45 and 46 respectively into the collecting pipe 47 which, in its turn, is connected to the pipe 48. The compressors 39 and 41 respectively are driven by the piston engines 40 and 42 respectively. If the aggregates 39, 40 and 41, 42 represent pressure-gas producers respectively, the air compressed in the compressors 39 and 41 is mixed with the exhaust gases of the engines 40 and 42 so that in this case the medium flowing to the gas turbine through the pipe 48 is pressure gas.

Since the auxiliary dynamos are only partly loaded at sea, the excess power thereof may also be used for increasing the capacity of the compressors 26 and 27.

By means of the electric motor 60 which is fed from the mains 57 through conductors 59 and switches 58 the speed of the compressors 26 and 27 is increased for this purpose.

The auxiliary dynamos 50 and 52, which may be driven by prime movers 49 and 51, respectively, produce the energy which is supplied to the mains 57 through conductors 53, 54 and switches 55, 56 respectively.

By combining the supply of energy by means of the medium compressed in the separately driven compressors with the last-mentioned energy supplement, all available power engines can be used completely under unfavourable conditions to enable the gas turbine to produce its full power.

Finally, the gas turbine is adapted to be started up in the same manner as the gas turbine shown in Figure 1 i. e. by supplying to the gas turbine, through the pipe 48, the medium compressed in the separately driven compressors.

Furthermore different auxiliary engines are adapted to be driven through this medium, for instance, the dynamo 63 which is driven by the expansion power engine 62 which is supplied with compressed medium through the pipe 61, or the pump 66 which is driven by the piston in the cylinder 65 wherein the medium expands which is supplied through the pipe 64.

The pipe 67 permits still further auxiliary machines to be driven by means of the compressed medium, for instance winches, steering gear and so on.

What I claim is:

1. A power installation comprising a gas turbine, a first fluid medium compressor means, shaft means drivingly connecting said gas turbine to said first compressor means, a second fluid medium compressor means, first separate driving means for said second compressor means, conduit means for conducting the fluid medium outputs of both said first compressor means and said second compressor means to said gas turbine, electric motor means coupled to said shaft means, dynamo means for supplying electric power to said electric motor means, and second separate driving means for said dynamo means.

2. A power installation comprising a gas turbine, a first fluid medium compressor means, shaft means drivingly connecting said gas turbine to said first compressor means, a second fluid medium compressor means, first separate driving means for said second compressor means, conduit means for conducting the fluid medium output of said first compressor means to said gas turbine, said gas turbine and said first compressor means including structural limitation means so constructed and arranged that at maximum driving energy supplied by said gas turbine to said first compressor, said first compressor supplies said turbine a quantity of fluid medium corresponding to what is required by said turbine with a load lower than the maximum load, second conduit means for conducting the fluid medium output of said second compressor to said turbine, separate driving means for said second compressor means, electric motor means coupled to said shaft means, dynamo means for supplying electric power to said electric motor means, and second separate driving means for said dynamo means.

3. A power installation comprising a first gas turbine, a first fluid medium compressor means, shaft means drivingly connecting said first gas turbine to said first compressor means, a second fluid medium compressor means, first separate driving means for said second compressor means, first conduit means for conducting the fluid medium outputs of both said first compressor means, and said second compressor means to said first gas turbine, electric motor means coupled to said shaft means, dynamo means for supplying electric power to said electric motor means, second separate driving means for said dynamo means, a second gas turbine, means driven by said second turbine, second conduit means connecting said first gas turbine to said second gas turbine, and intermediate heating means positioned in said second conduit means.

ALBERT A. DROS.

REFERENCES CITED

The following references are of record in the file of this patent:

UNITED STATES PATENTS

| Number    | Name           | Date          |
|-----------|----------------|---------------|
| 1,593,571 | Curtis         | July 27, 1926 |
| 1,959,795 | Lysholm        | May 22, 1934  |
| 2,414,166 | Pateras Pescara| Jan. 14, 1947 |
| 2,495,604 | Salzmann       | Jan. 25, 1950 |

FOREIGN PATENTS

| Number | Country     | Date          |
|--------|-------------|---------------|
| 76,249 | Switzerland | Nov. 16, 1917 |